United States Patent
Molnar et al.

(10) Patent No.: US 7,616,209 B1
(45) Date of Patent: Nov. 10, 2009

(54) PRESCIENT CACHE MANAGEMENT

(75) Inventors: Steven E. Molnar, Chapel Hill, NC (US); Mark J. French, Raleigh, NC (US); Cass W. Everitt, Round Rock, TX (US); Adam Clark Weitkemper, Morrisville, NC (US); Phillip Keslin, San Jose, CA (US); David L. Anderson, Durham, NC (US); George R. Lynch, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 554 days.

(21) Appl. No.: 11/454,230

(22) Filed: Jun. 16, 2006

(51) Int. Cl.
G09G 5/36 (2006.01)
G06F 13/00 (2006.01)
G06F 13/28 (2006.01)

(52) U.S. Cl. .................. 345/545; 345/557; 711/137
(58) Field of Classification Search .............. 345/545, 345/557; 711/137, 118
See application file for complete search history.

(56) References Cited

U.S. PATENT DOCUMENTS

| | | | |
|---|---|---|---|
| 5,131,080 A | 7/1992 | Fredrickson et al. | |
| 5,548,709 A | 8/1996 | Hannah et al. | |
| 5,808,617 A | 9/1998 | Kenworthy et al. | |
| 5,831,640 A * | 11/1998 | Wang et al. | 345/552 |
| 5,864,342 A | 1/1999 | Kajiya et al. | |
| 5,867,166 A | 2/1999 | Myhrvold et al. | |
| 5,870,097 A | 2/1999 | Snyder et al. | |
| 5,886,701 A | 3/1999 | Chauvin et al. | |
| 5,949,428 A | 9/1999 | Toelle et al. | |
| 5,990,904 A | 11/1999 | Griffin | |
| 5,999,189 A | 12/1999 | Kajiya et al. | |
| 6,008,820 A | 12/1999 | Chauvin et al. | |
| 6,016,150 A | 1/2000 | Lengyel et al. | |
| 6,246,415 B1 | 6/2001 | Grossman et al. | |
| 6,252,608 B1 | 6/2001 | Snyder et al. | |
| 6,292,194 B1 | 9/2001 | Powell, III | |
| 6,326,964 B1 | 12/2001 | Snyder et al. | |
| 6,654,022 B1 * | 11/2003 | Egan | 345/557 |
| 6,717,577 B1 | 4/2004 | Cheng et al. | |
| 6,720,969 B2 | 4/2004 | Lavelle et al. | |
| 6,985,249 B2 | 1/2006 | Klassen et al. | |
| 2002/0171655 A1 | 11/2002 | Lavelle et al. | |
| 2004/0135784 A1 | 7/2004 | Cohen et al. | |
| 2004/0207876 A1 | 10/2004 | Aschenbrenner et al. | |

* cited by examiner

Primary Examiner—Ryan R Yang
(74) Attorney, Agent, or Firm—Patterson & Sheridan, LLP

(57) ABSTRACT

Prescient cache management methods and systems are disclosed. In one embodiment, within a pre-raster engine operations stage in a graphics rendering pipeline, tile entries are stored in a buffer. Each of these tile entries is related a transaction request that enters the pre-raster engine operations stage and has a screen coordinates field and a conflict field. If this buffer includes a first tile entry, which is related to a first transaction request associated with a first tile, and a second tile entry, which is related to a second transaction request that enters the pre-raster engine operations stage after the first transaction request and is also associated with the first tile, the conflict field of the first tile entry is updated with a conflict type that reflects a number of tile entries between the first tile entry and the second tile entry.

20 Claims, 9 Drawing Sheets

PRESCIENT CACHE MANAGEMENT

BACKGROUND OF THE INVENTION

1. Field of the Invention

Embodiments of the present invention relate generally to video processing and more specifically to prescient cache management methods and systems.

2. Description of the Related Art

Unless otherwise indicated herein, the approaches described in this section are not prior art to the claims in this application and are not admitted to be prior art by inclusion in this section.

A graphics pipeline generally splits into three main functional stages, namely, the application stage, the geometry stage, and the rasterization stage. The application stage generates the 3D triangles that are representative of a scene. The geometry stage transforms these 3D triangles into 2D triangles and projects the 2D triangles onto a screen according to certain view points. Then the rasterization stage dices these 2D triangles into pixels and computes a color for each of these pixels to form the final image.

The rasterization stage generally includes one or more Raster OPeration ("ROP") units, each of which is responsible for reading and writing depth and stencil data, comparing depth and stencil data, reading and writing color data, and performing alpha blending and testing. These ROP units frequently access the frame buffer, where many of the data types mentioned above are stored. The frequent accesses, however, consume significant bandwidth of the frame buffer and create bottlenecks in the graphics pipeline.

One way to improve the performance of the ROP units and, consequently, the overall performance of the graphics pipeline is to reduce the number of accesses to the frame buffer. A common approach is to use a cache to store frequently accessed data, so that the ROP units can access the cached data without having to retrieve the data from or write the data to the frame buffer. However, given the various design and cost constraints, only a limited size cache is feasible. As a result, cache misses can still occur regularly and result in significant penalties, which degrade the overall performance of the graphics pipeline.

Moreover, most caches are reactive in nature, because the decisions to either cache or evict certain in these caches are made at the time the data arrive. Without the foresight of the data that will arrive in the future, these caching decisions are necessarily imperfect.

As the foregoing illustrates, what is needed is a way to efficiently and intelligently utilize the limited caching resources to enhance the performance of the ROP units and the overall performance of the graphics pipeline.

SUMMARY OF THE INVENTION

Prescient cache management methods and systems are disclosed. In one embodiment, within a pre-raster engine operations stage in a graphics rendering pipeline, tile entries are stored in a buffer. Each of these tile entries is related a transaction request that enters the pre-raster engine operations stage and has a screen coordinates field and a conflict field. If this buffer includes a first tile entry, which is related to a first transaction request associated with a first tile, and a second tile entry, which is related to a second transaction request that enters the pre-raster engine operations stage after the first transaction request and is also associated with the first tile, the conflict field of the first tile entry is updated with a conflict type that reflects a number of tile entries between the first tile entry and the second tile entry. One advantage of the disclosed methods and systems is that they provide a way to capture certain look-ahead information and use the information to intelligently manage which tiles are stored in local memory, thereby optimizing the use of this limited memory resource.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Prescient cache management methods and systems are described. In the following description, for the purposes of explanation, numerous specific details are set forth in order to provide a thorough understanding of the present invention. It will be apparent, however, to one skilled in the art that the present invention may be practiced without these specific details.

Throughout this disclosure, a geometric primitive, such as a triangle, can be further divided into a discrete and finite grid of "tiles," each of which includes a discrete and finite grid of "screen pixels," which are used interchangeably with "pixels." The depth value and stencil data associated with a pixel are used to determine pixel visibility. The combination of depth value and stencil data is referred to herein as "Z-data."

Figure 1:
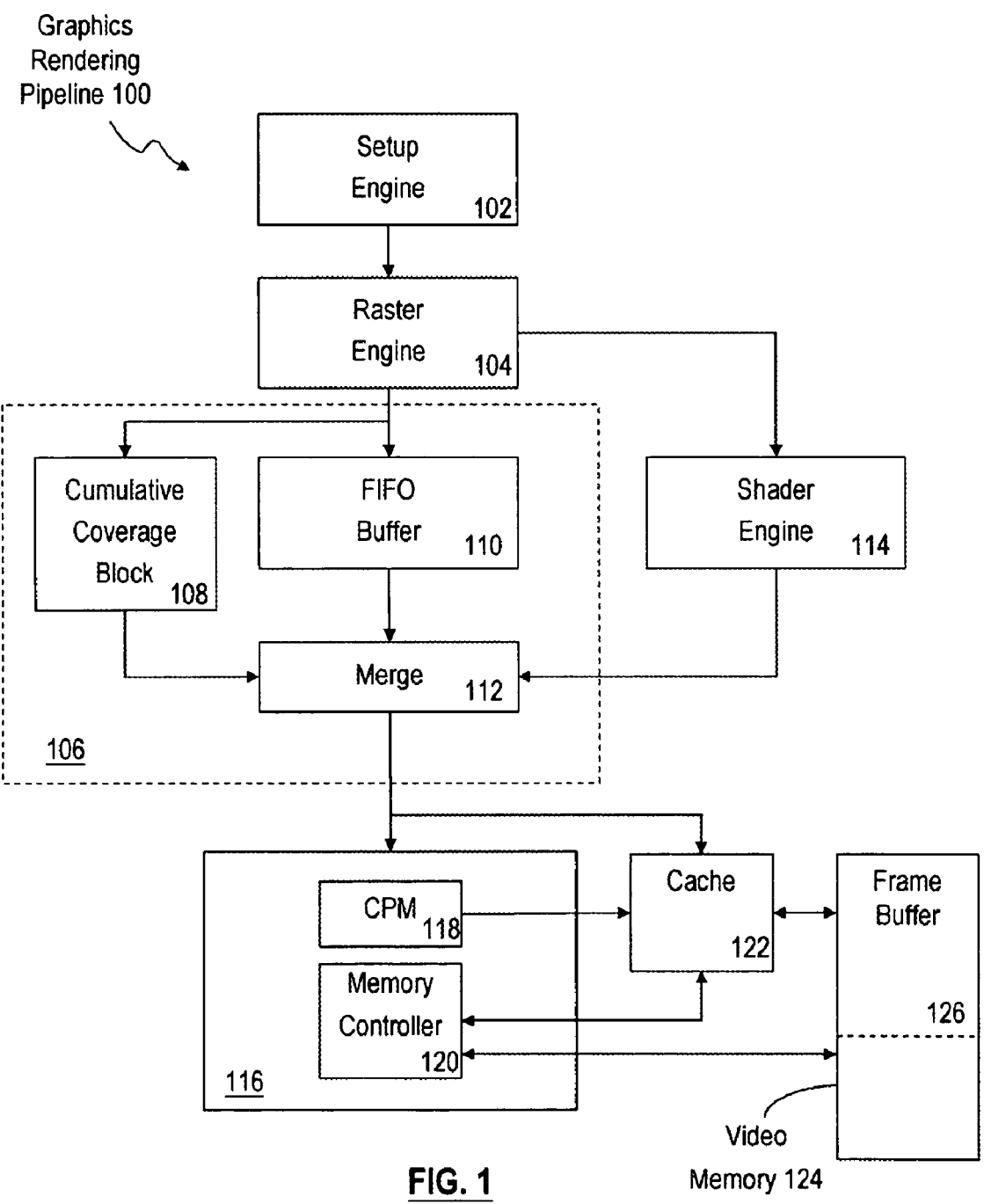
FIG. 1 is a conceptual diagram of data flow through a graphics rendering pipeline, according to one embodiment of the present invention.

FIG. 1 is a conceptual diagram of data flow through graphics rendering pipeline 100, according to one embodiment of the present invention. Specifically, one embodiment of setup engine 102 receives geometric primitives from a graphics driver, which is executed by a processor in a system, such as system 600 shown in FIG. 6, and generates 2D primitives suitable for the operations of raster engine 104. Setup engine 102 also tracks the rendering states in graphics rendering pipeline 100 and coordinates certain changes therein. Some rendering states are established prior to initiating the rendering process on a given primitive, and some rendering states are dynamically updated as the primitive progresses through graphics rendering pipeline 100.

One embodiment of raster engine 104 dices the 2D geometric primitives into tiles of pixels and maintains the 2D screen coordinates, (x, y), for each tile. In addition, raster engine 104 traverses the 2D geometric primitives to identify the pixels in these tiles that are within the coverage area of the primitives and then sets a bit in a coverage mask for each of the covered pixels. Then, raster engine 104 distributes the (x, y) coordinates and the coverage mask for each of the tiles to Pre-Raster OPerations ("PROP") unit 106 and shader engine 114.

One embodiment of PROP unit 106 manages the traffic flow in graphics rendering pipeline 100 by merging data from First-In-First-Out ("FIFO") buffer 110, shader engine 114, and its look-ahead logic, Cumulative Coverage Block ("CCB") 108 and distributing the merged data to ROP unit 116. For each incoming tile corresponding to one or more transaction requests, FIFO buffer 110 stores the aforementioned (x, y) coordinates and the coverage mask information of the tile. Shader engine 114 computes, without limitation, color and Z-data for the pixels within the tile, as determined by the programming of the shader engine 114. One embodiment of CCB 108 tracks the transaction requests received by PROP unit 106 and maintains a tile entry for each such transaction request. In addition, CCB 108 uses information from each incoming transaction request and the tile to which the incoming transaction request corresponds to annotate a previous tile entry that it maintains. Because the operations of PROP unit 106 on this incoming transaction request precede the operations of ROP unit 116 on the tile corresponding to the incoming transaction request in graphics rendering pipeline 100, the annotated information maintained by CCB 108 can be viewed as "look-ahead" information from the perspective of ROP unit 116. Subsequent paragraphs will discuss CCB 108 in further detail.

ROP unit 116 generally reads and writes Z-data, compares Z-data, reads and writes color data, and performs alpha blending and testing on the merged data from PROP unit 106. ROP unit 116 also interacts with cache 122 and frame buffer 126, which resides in video memory 124. In one implementation, ROP unit 116 further includes cache policy manager ("CPM") 118 and memory controller 120 to efficiently manage the use of cache 122, video memory 124, and other memory resources. CPM 118 uses the look-ahead intelligence discussed above to establish the policies to manage on-chip caches, such as cache 122, and includes internal logic to handle incorrect or untrustworthy look-ahead information. Memory controller 120 also uses the look-ahead intelligence to identify a cluster of memory transactions to be prefetched. In an alternative embodiment, CPM 118 and memory controller 120 may be combined into a single functional block. In yet another alternative embodiment, CPM 118 is also responsible for directing the merged data from merge unit 112 of PROP unit 106 to cache 122. In still another alternative embodiment, cache 122 and CPM 118 may also be combined into a single functional block. Subsequent paragraphs will discuss CPM 118 and memory controller 120 in further detail. In addition, one with ordinary skill in the art will recognize that ROP unit 116 can be implemented by two distinct units, a Z Raster OPerations ("ZROP") unit and a Color Raster Operations ("CROP"). Depending on the rendering state of graphics rendering pipeline 100, the operations of ZROP unit could either precede or follow the operations of shader engine 114.

Figure 2:
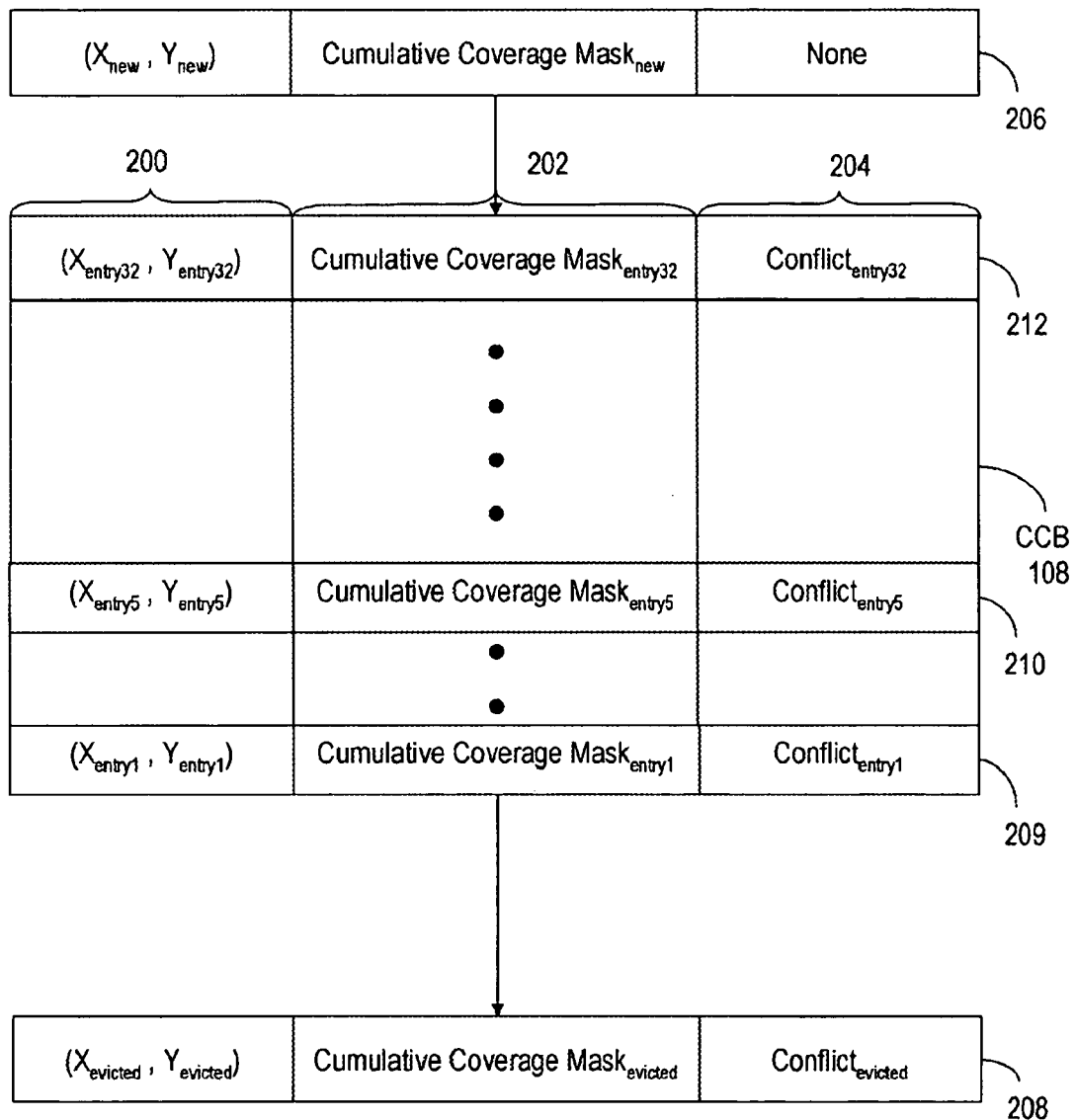
FIG. 2 illustrates the structure and the operations of one embodiment of the cumulative coverage block, according to one embodiment of the present invention.

FIG. 2 illustrates the structure and the operations of one embodiment of CCB 108. In particular, CCB 108 is an intelligent FIFO buffer, which has associative tag lookup logic and contains a number of tile entries. When CCB 108 receives a transaction request involving a tile, a new tile entry is generated and pushed into CCB 108. Then, the oldest tile entry in the buffer is evicted to make room for this new addition. According to FIG. 2, tile entry 209 is the oldest entry within CCB 108, and tile entry 212 is the newest. Also, if tile entry 210 is considered the current tile entry, then relative to tile entry 210, tile entry 209 is a "previous" tile entry, and tile entry 212 is a "subsequent" tile entry. The number of tile entries in CCB 108 corresponds to the number of transaction requests that CCB 108 tracks and also constitutes the size of the look-ahead window from the perspective of ROP unit 116. Each tile entry includes at least three fields, namely, coordinates field 200, cumulative coverage mask field 202, and conflict field 204. Coordinates field 200 of one tile entry, the tile entry A, contains the (x, y) coordinates of a tile, the tile A, that is associated with a transaction request. Cumulative coverage mask field 202 of the tile entry A contains the combined coverage mask of tile entry A and all other tile entries that satisfy at least the following conditions: (a) the other tile entries reside in CCB 108 and have the same (x, y) coordinates as the tile entry A and (b) are pushed into CCB 108 later in time than the tile entry A. Conflict field 204 of the tile entry A contains information indicative of whether a subsequent tile entry refers to the same tile A and if so, where this subsequent tile entry is expected to be relative to tile entry A. In other words, conflict field 204 of the tile entry A indicates when the next transaction request referring to the same tile A is expected. This information allows the aforementioned CPM 118 to formulate intelligent caching decisions. Subsequent paragraphs will discuss CPM 118 in further detail.

As an illustration, suppose CCB 108 contains 32 tile entries. Suppose also a new tile entry, tile entry 206, is pushed into CCB 108. Consequently, an existing tile entry, tile entry 208, will be evicted from CCB 108 to make room for the new tile entry. In one implementation, before CCB 108 evicts tile entry 208, CCB 108 updates all the relevant tile entries. For example, suppose $(x_{entry5}, y_{entry5})$ and $(x_{entry32}, y_{entry32})$ are the same as $(x_{new}, y_{new})$. CCB 108 checks $(x_{new}, y_{new})$ of tile entry 206 against the (x, y) coordinates of its existing tile entries. For all the tile entries whose (x, y) coordinates match $(x_{new}, y_{new})$, such as tile entries 210 and 212 in this example, CCB 108 updates the fields of the matching tile entries. More specifically, one embodiment of CCB 108 updates conflict field 204 of each tile entry with one of the following four conflict types, namely, NONE, NEXT, NEAR, and FAR. NONE for a particular tile entry means that none of the subsequent tile entries in CCB 108 currently has the same (x, y) coordinates as this particular tile entry. NEXT means that the next tile entry subsequent to this particular tile entry in CCB 108 has the same (x, y) coordinates as this particular tile entry. NEAR means that the subsequent tile entry in CCB 108 that has the same (x, y) coordinates as this particular tile entry is nearby this particular tile entry in time. FAR means that the subsequent tile entry in CCB 108 that has the same (x, y) coordinates as this particular tile entry is far away from this particular tile entry in time. In one implementation, CCB 108 utilizes "distances" to quantify "nearby" or "far away" in time. In particular, "distance" here refers to the number of tile entries between two tile entries. Thus, if a tile entry is annotated as either NEAR or FAR relative to another tile entry, then that means the (x, y) coordinates of the two tile entries match, and the distance between the two tile entries falls within a certain range. With these different conflict types, CCB 108 tracks when certain transaction requests are expected to refer to the same tiles. This look-ahead information, from the perspective of CPM 118, helps CPM 118 manage its caching resources. Furthermore, it should be apparent to one with ordinary skill in the art to recognize that CPM 118 assigns a higher priority (in terms of deciding whether to store in a cache) to the tiles corresponding to tile entries that are closer together than the tiles corresponding to tile entries that are farther apart.

Using FIG. 2 as an illustration for an incoming tile entry being pushed into CCB 108, such as tile entry 206, its conflict field 204 is initially annotated as NONE. If $(x_{entry32}, y_{entry32})$ are equal to $(x_{new}, y_{new})$, and the distance between tile entry 212 and tile entry 206 is 0, then CCB 108 annotates conflict$_{entry32}$ as NEXT. Suppose category NEAR is designated to cover the distance range between 2 and 24, and category FAR is designated to cover the distance range between 25 and 31. If $(x_{entry5}, y_{entry5})$ are equal to $(x_{entry32}, y_{entry32})$ and the distance between tile entry 210 and tile entry 212 is 27, then conflict$_{entry5}$ is set to FAR. On the other hand, suppose category FAR is designated to cover the distance range between 30 and 31, and category NEAR is designated to cover the distance range between 2 and 29. Then, with the same distance of 27, conflict$_{entry5}$ is set to NEAR. A person with ordinary skill in the art will recognize that these aforementioned ranges may vary significantly based on different system requirements and shall not be construed to limit the scope of the claimed invention.

In addition to conflict field 204, one embodiment of CCB 108 also updates cumulative coverage mask field 202 of a matching tile entry. Specifically, if the (x, y) coordinates of a new tile entry, such as $(x_{new}, y_{new})$ of tile entry 206, match the (x, y) coordinates of an existing tile entry, such as $(x_{entry32}, y_{entry32})$, then CCB 108 combines cumulative coverage mask$_{new}$ with cumulative coverage mask$_{entry32}$ and places the combined mask in cumulative coverage mask field 202 of tile entry 212.

Figure 3A:
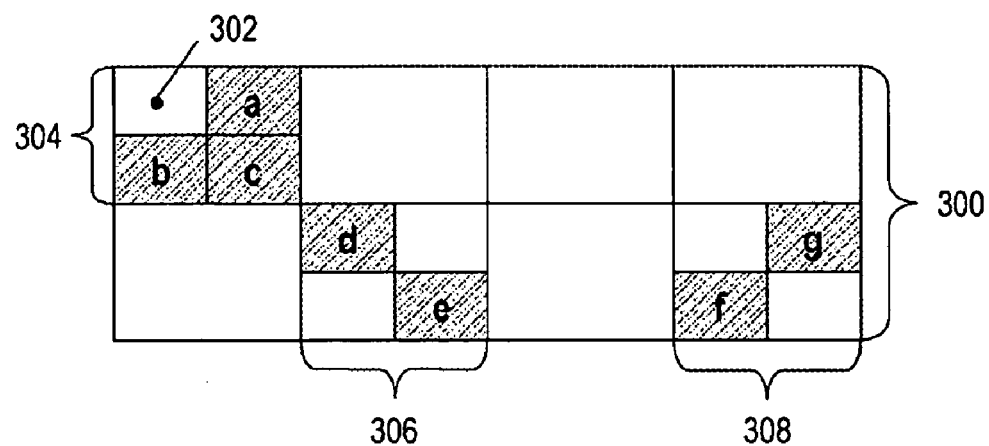
FIG. 3A is a conceptual diagram of an 8×4 tile with certain pixel clusters covered by geometric primitives.
Figure 3B:
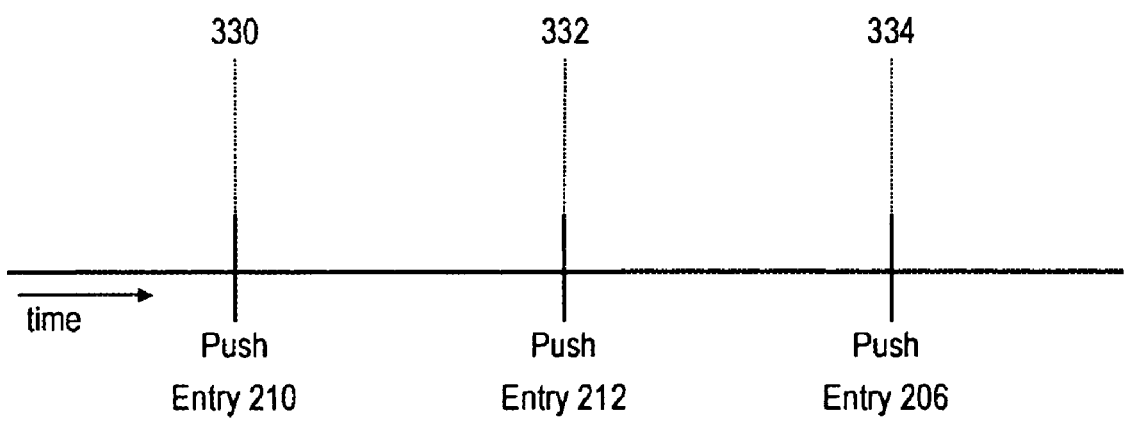
FIG. 3B illustrates a time line of pushing the original coverage mask corresponding to each of the pixel clusters in a tile into the cumulative coverage block, according to one embodiment of the present invention.

To further illustrate the updating of cumulative coverage mask field 202 in instances where more than one matching tile entry exists in CCB 108, in conjunction with FIG. 2, a conceptual diagram of a tile and a time line diagram are provided. FIG. 3A is a conceptual diagram of an 8×4 tile with certain pixel clusters covered by geometric primitives. FIG. 3B illustrates a time line of reflecting when the original coverage mask corresponding to each of the pixel clusters in tile 300 is pushed into CCB 108. An "original coverage mask" here refers to the coverage mask generated by raster engine 104 as shown in FIG. 1 that has not been operated on by CCB 108. Suppose $(x_{entry5}, y_{entry5})$ of tile entry 210, $(x_{entry32}, y_{entry32})$ of tile entry 212, and $(x_{new}, y_{new})$ of tile entry 206 all correspond to point 302 of tile 300 and therefore are equal to one another. In other words, tile entries 210, 212, and 206 refer to the same tile, tile 300. Suppose pixel clusters 304, 306, and 308 correspond to the original coverage masks maintained in tile entry 210, 212, and 206, respectively. At time 330, CCB 108 pushes tile entry 210 into its buffer with the original coverage mask corresponding to pixel cluster 304. At time 332, CCB 108 pushes tile entry 212 into its buffer with the original coverage mask corresponding to pixel cluster 306 and generates a new cumulative coverage mask$_{entry5}$ of tile entry 210 by combining the two original coverage masks. Thus, the resulting cumulative coverage mask$_{entry5}$ after time 332 corresponds to both pixel clusters 304 and 306. Similarly, at time 334, CCB 108 pushes tile entry 206 with the original coverage mask corresponding to pixel cluster 308 into its buffer and generates a new cumulative coverage mask$_{entry5}$ of tile entry 210 by combining this newly stored original coverage mask with the cumulative coverage mask$_{entry5}$ covering pixel clusters 304 and 306. Therefore, the resulting cumulative coverage mask$_{entry5}$ of tile entry 210 after time 334 corresponds to pixel clusters 304, 306, and 308.

With this cumulative coverage mask$_{entry5}$ of entry 210 after time 334, instead of making three separate transaction requests to tile 300 to access the different pixel clusters, a single transaction request can access all the pixel clusters in tile 300. Furthermore, with the information provided by cumulative coverage mask$_{entry5}$ of entry 210 after time 334, one embodiment of memory controller 120 shown in FIG. 1 is able to fetch with a single request only the relevant data in the tile. Using FIG. 3A as an illustration, instead of fetching the entire pixel clusters 302, 306, and 308 indiscriminately and in separate requests, memory controller 120 fetches only the covered pixels, as reflected by the shaded areas in the pixel clusters corresponding to pixels a, b, c, d, e, f, and g, with a single request.

Figure 4:
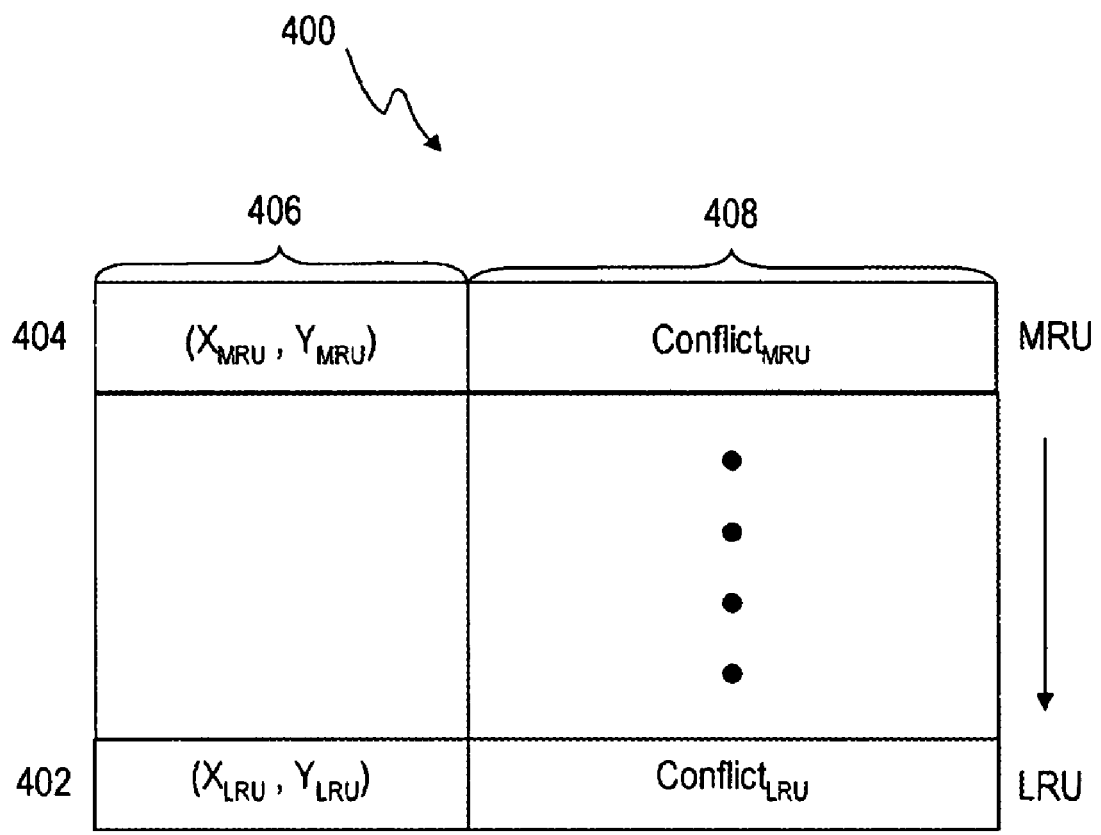
FIG. 4 is a conceptual diagram of a table that the cache policy manager maintains, according to one embodiment of the present invention.

Furthermore, using the look-ahead information in CCB 108, one embodiment of ROP 116 shown in FIG. 1 tries to predict when it should expect to receive certain tiles and manages its resources accordingly. Particularly, one embodiment of CPM 118 maintains a table that tracks at least the tiles stored in cache 122 and the conflict status of these tiles. CPM 118 obtains the conflict status of the tiles from CCB 108. FIG. 4 is a conceptual diagram of a table that CPM 118 maintains. Table 400 contains n table entries, each of which contains information regarding a particular cached tile. A "cached tile" herein refers to a tile that is stored in at least one cache entry of a cache. Each "cache entry" herein refers to storage for one tile. The table entries are organized according to the amount of time that has transpired since each of the cached tiles was last used. Thus, in one implementation, the oldest table entry, such as table entry 402, contains information relating to the least recently used ("LRU") cached tile in cache 122, and the newest table entry, such as table entry 404, contains information relating to the most recently used ("MRU") cached tile. Each table entry has at least two fields, namely, cached coordinates field 406 and table conflict field 408. In monitoring traffic into and out of cache 122, CPM 118 reshuffles the table entries in table 400 to reflect the recent accesses of the tiles in cache 122 and updates cached coordinates field 406 to correspond to any changes to the tiles stored in cache 122.

CPM 118 follows a set of rules to determine which tiles should be stored in or evicted from cache 122 and to annotate table conflict status field 408 of table 400. FIG. 5A, 5B, 5C, 5D, and 5E collectively illustrate one embodiment of the rules. Each incoming tile is associated with one of the four conflict types, namely, NONE, NEAR, NEXT, and FAR, as mentioned above. This conflict information is kept in conflict field 204 of CCB 108 as shown in FIG. 2 and is denoted as conflict$_{incoming}$ in the following discussions.

Figure 5A:
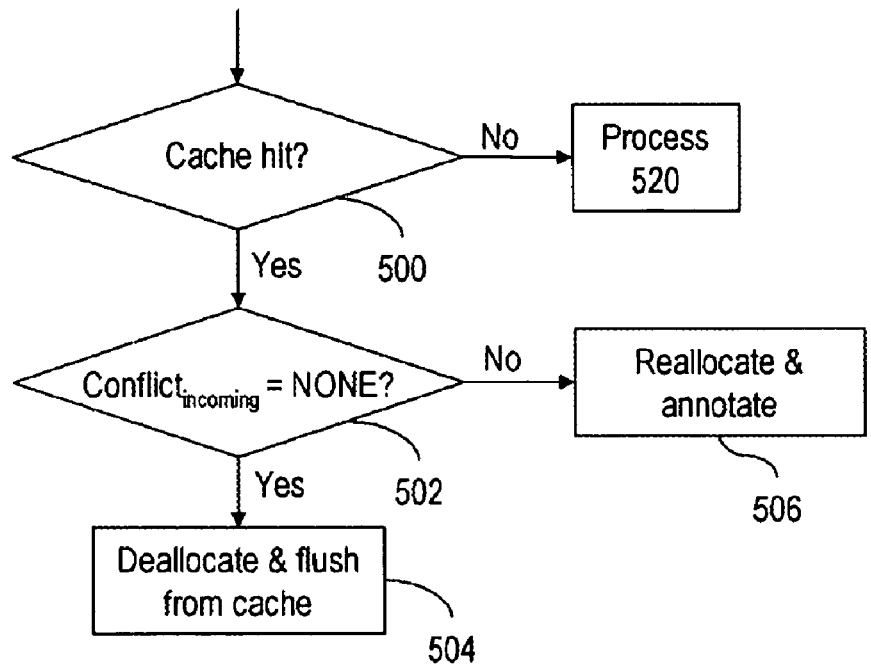
FIG. 5A illustrates a first part of one process that one embodiment of the cache policy manager follows to use the look-ahead information in making its caching decisions, according to according to one embodiment of the present invention.

As set forth in FIG. 5A, if CPM 118 determines that the incoming tile has the same (x, y) values as one of the tiles cached in cache 122, otherwise referred to as a cache hit, in decision step 500, CPM 118 proceeds to inspect whether the conflict$_{incoming}$ information is NONE in decision step 502. If the conflict$_{incoming}$ information is NONE, then in step 504 CPM 118 causes the tile in cache 122, which matches the incoming tile, to be deallocated and flushed. On the other hand, if the conflict$_{incoming}$ information is not NONE, then CPM 118 in step 506 causes the matching tile in cache 122 to be reallocated, reshuffles the table entries in table 400 to make this matching tile an MRU table entry, and annotates table conflict field 400 of this MRU table entry with the conflict$_{incoming}$ information.

Figure 5B:
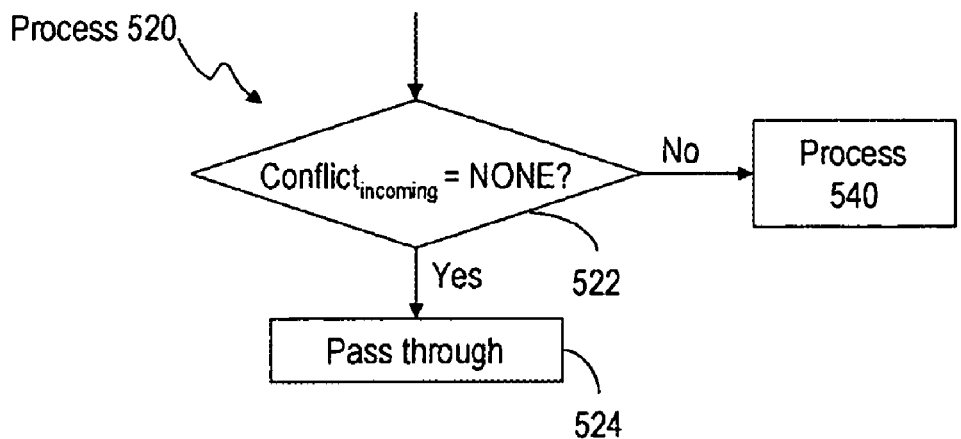
FIG. 5B illustrates a second part of one process that one embodiment of the cache policy manager follows to use the look-ahead information in making its caching decisions, according to according to one embodiment of the present invention.

If the incoming tile does not match any of the cache entries in cache 122, otherwise referred to as a cache miss, then CPM 118 proceeds to follow process 520 shown in FIG. 5B. More particularly, CPM 118 inspects whether the conflict$_{incoming}$ information is NONE in decision step 522. If the conflict$_{incoming}$ information is NONE, then in step 524 CPM 118 permits the incoming tile to pass through and does not cause the tile to be cached. On the other hand, if the conflict$_{incoming}$ information is not NONE, then CPM 118 proceeds to follow process 540 shown in FIG. 5C.

Figure 5C:
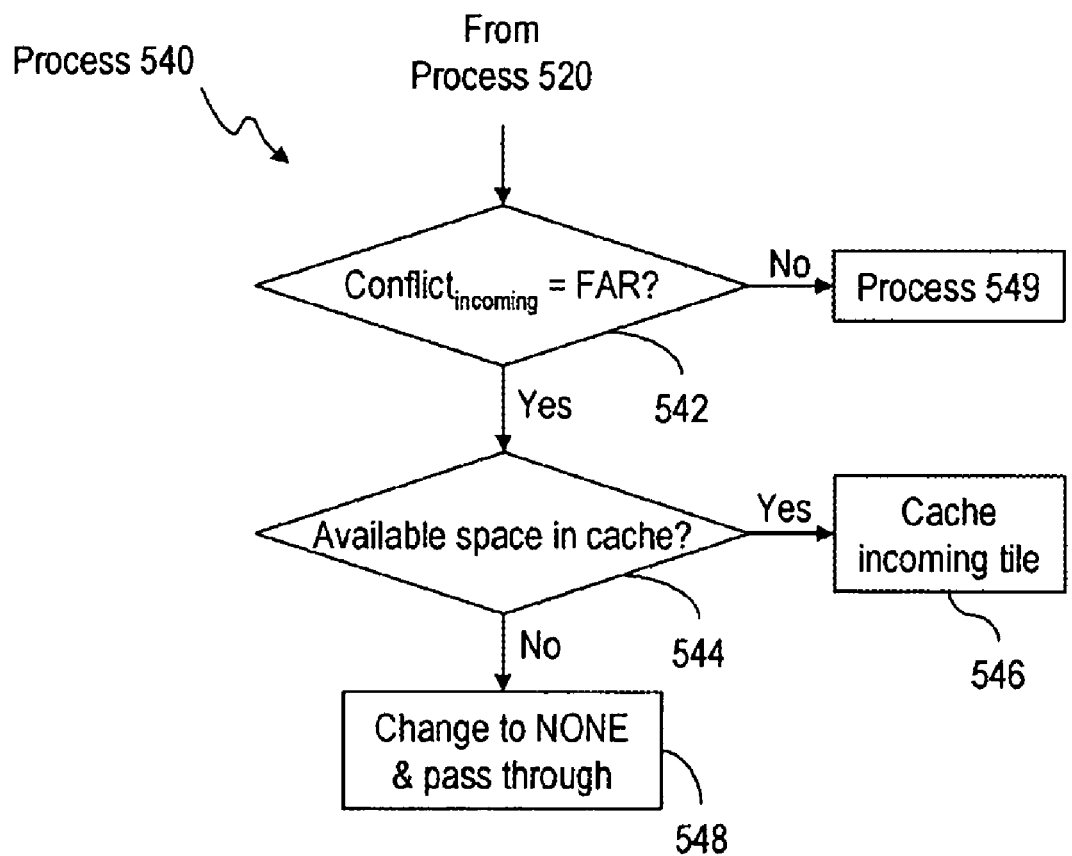
FIG. 5C illustrates a third part of one process that one embodiment of the cache policy manager follows to use the look-ahead information in making its caching decisions, according to according to one embodiment of the present invention.

In FIG. 5C, CPM 118 inspect whether the conflict$_{incoming}$ information is FAR in decision step 542. If the conflict$_{incoming}$ information is FAR, then CPM 118 checks whether there is available space in cache 122 in decision step 544. If there is available space in the cache, then in step 546 CPM 118 causes the incoming tile to be cached and updates the corresponding table entry in table 400 with the FAR conflict$_{incoming}$ information. On the other hand, if the cache is full, then in step 548 CPM 118 proceeds to change the conflict$_{incoming}$ information from FAR to NONE and causes the incoming tile to pass through.

Figure 5D:
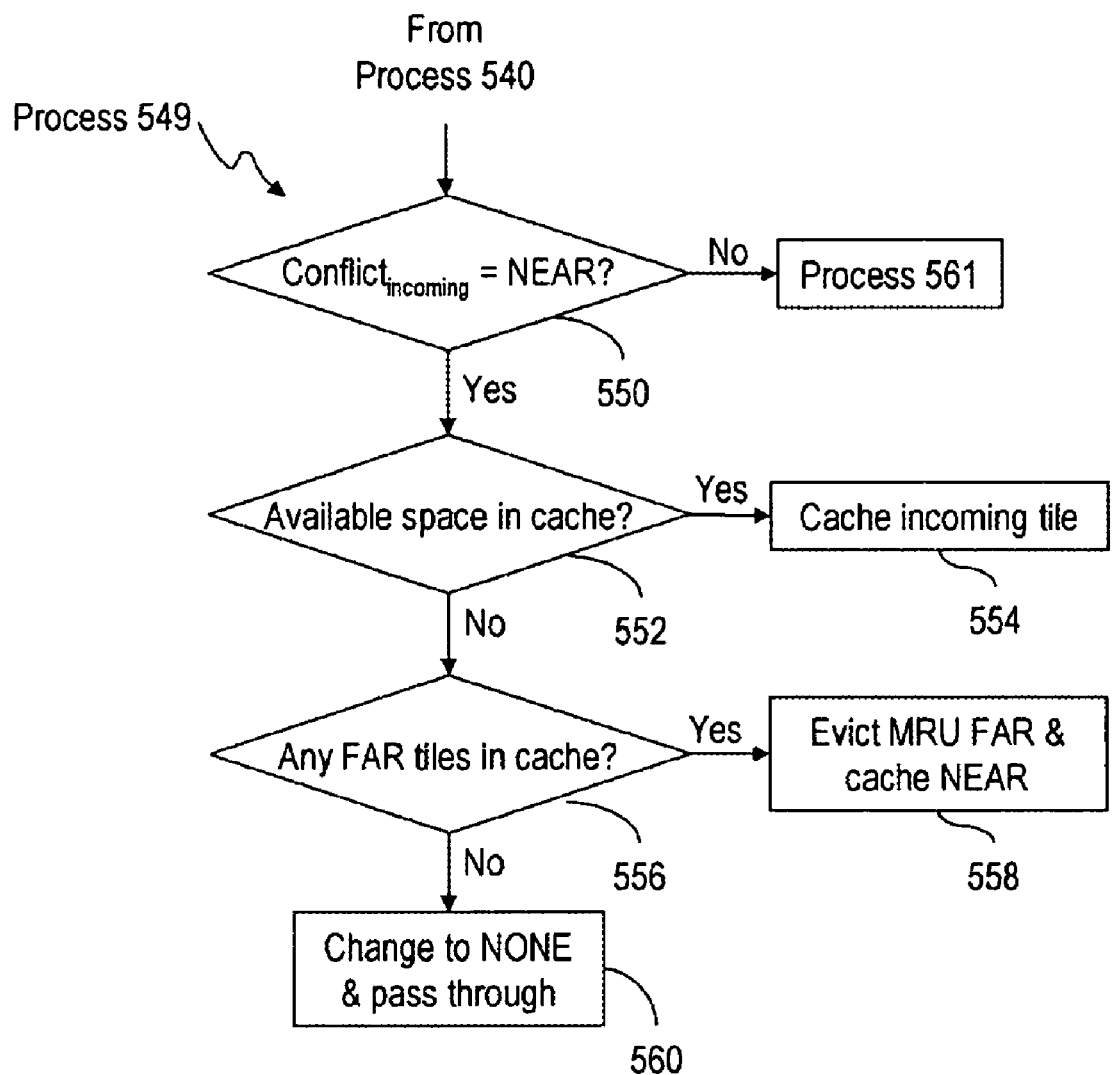
FIG. 5D illustrates a fourth part of one process that one embodiment of the cache policy manager follows to use the look-ahead information in making its caching decisions, according to according to one embodiment of the present invention.

If the conflict$_{incoming}$ information is not FAR, but CPM 118 determines the conflict$_{incoming}$ information is NEAR in decision step 550 shown in FIG. 5D, then CPM 118 follows process 549. Specifically, CPM 118 checks whether there is available space in cache 122 in decision step 552. If there is available space in the cache, then in step 554 CPM 118 causes the incoming tile to be cached and updates the corresponding table entry in table 400 with the NEAR conflict$_{incoming}$ information. On the other hand, if the cache is full but CPM 118 determines in decision step 556 that there are tiles in cache 122 that are associated with the FAR conflict type, then in step 558 CPM 118 proceeds to cause the tile with the FAR conflict type that is also the MRU among all the FAR tiles to be evicted and causes the incoming tile to be cached and updates the corresponding table entry in table 400 with the NEAR conflict$_{incoming}$ information. If there are no tiles with the FAR conflict type in cache 122, then in step 560 CPM 118 proceeds to change the conflict$_{incoming}$ information from NEAR to NONE and causes the incoming tile to pass through.

Figure 5E:
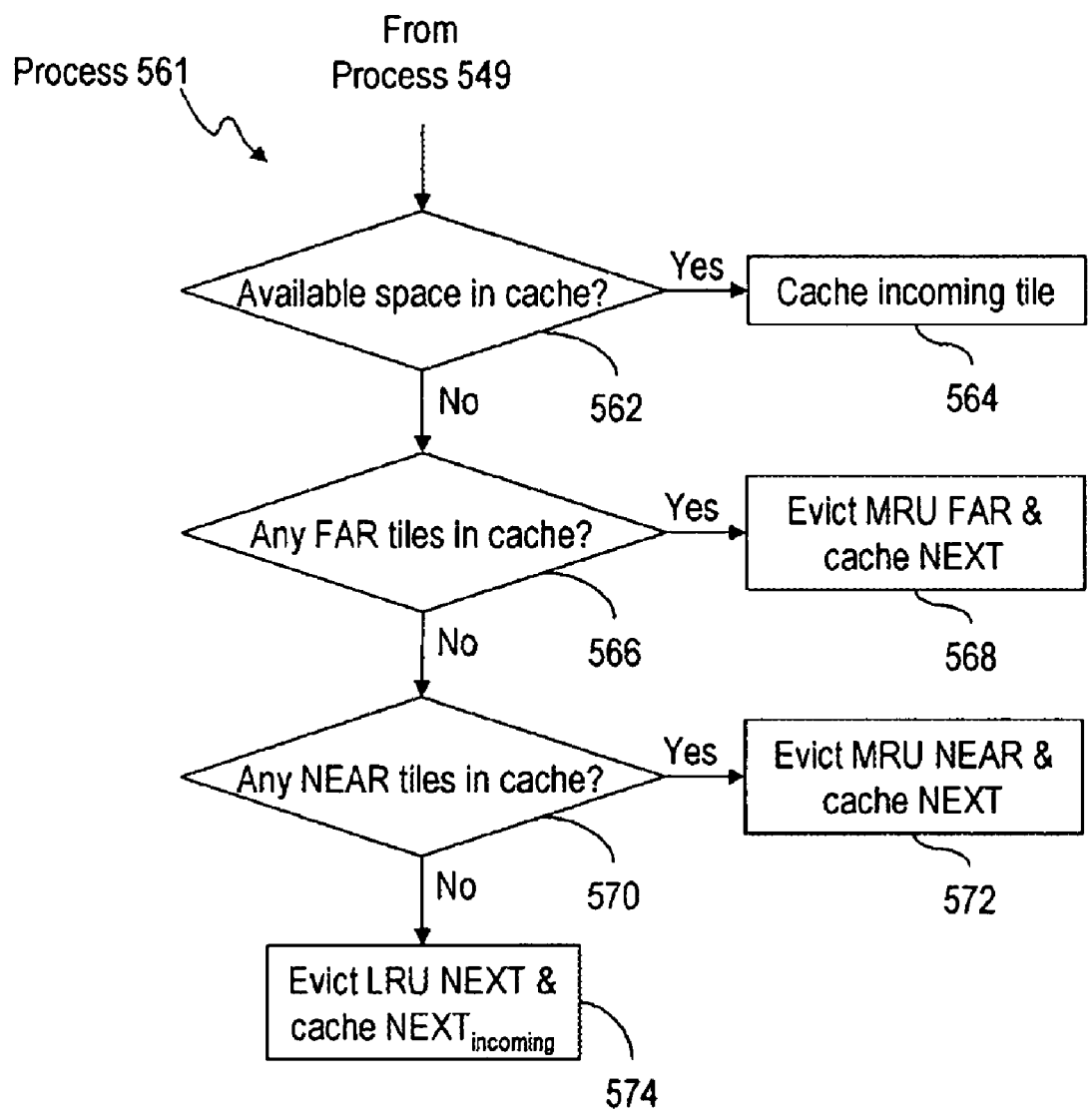
FIG. 5E illustrates a fifth part of one process that one embodiment of the cache policy manager follows to use the look-ahead information in making its caching decisions, according to according to one embodiment of the present invention.

With the conflict$_{incoming}$ information as NEXT, CPM 118 follows process 561 shown in FIG. 5E. Specifically, CPM 118 checks whether there is available space in cache 122 in decision step 562. If there is available space in the cache, then in step 564 CPM 118 causes the incoming tile to be cached and updates the corresponding table entry in table 400 with the NEXT conflict$_{incoming}$ information. On the other hand, if the cache is full but CPM 118 determines in decision step 566 that there are tiles in cache 122 that are associated with the FAR conflict type, then in step 568 CPM 118 proceeds to cause the tile with the FAR conflict type that is also the MRU among all the FAR tiles to be evicted and causes the incoming tile to be cached and updates the corresponding table entry in table 400 with the NEXT conflict$_{incoming}$ information. If there are no tiles with the FAR conflict type in cache 122, but CPM 118 determines in decision step 570 that there are tiles in cache 122 that are associated with the NEAR conflict type, then in step 572 CPM 118 proceeds to cause the tile with the NEAR conflict type that is also the MRU among all the NEAR tiles to be evicted and causes the incoming tile to be cached and updates the corresponding table entry in table 400 with the NEXT conflict$_{incoming}$ information. If there are no tiles with either the FAR or NEAR conflict type in cache 122, then in step 574 CPM 118 proceeds to cause the tile with the NEAR conflict type that is also the LRU among all the NEAR tiles to be evicted and causes the incoming tile to be cached and updates the corresponding table entry in table 400 with the NEXT conflict$_{incoming}$ information.

It should be noted that the rules discussed above direct how CPM 118 uses the look-ahead intelligence that CCB 108 captures from a stream of transaction requests to anticipate which tiles and even which pixel clusters within those tiles will be accessed. With this prescient knowledge, CPM 118 is able to effectively manage its memory resources, improve cache hit rates, and as a result contribute to the enhancement of the overall performance of the graphics rendering pipeline.

Moreover, one embodiment of CPM 118 further includes logic to detect and recover from situations in which the look-ahead information provided by CCB 108 is no longer accurate or trustworthy. To illustrate how the look-ahead information becomes inaccurate, suppose two transaction requests involve the same tile. The tile entry in CCB 108 corresponding to the first transaction request is annotated as NEXT, and the tile entry in CCB 108 corresponding to the second transaction request is annotated as NONE. Suppose further that after ROP unit 116 receives the first transaction request and caches the corresponding tile in cache 122, but before ROP unit 116 receives the second transaction request, the second transaction request is deleted by some operations of graphics rendering pipeline 100. If CPM 118 does not detect the deletion, then CPM 118 will not be able to properly evict the tile corresponding to these transactions from cache 122. Thus, in one embodiment, CPM 118 maintains a pre-determined count of transaction requests for each of the conflict types NEXT, NEAR, and FAR, within which a subsequent matching transaction request is expected. So, if CPM 118 does not receive the expected subsequent transaction request within the pre-determined count, then CPM 118 marks the transaction as ORPHAN and flushes the tile corresponding to that transaction from cache 122 according to the following logic:

If an incoming tile is associated with the conflict type of NEXT, NEAR, or FAR;

If there is a cache miss;

If cache 122 is full; and

If there are cache entries in cache 122 that are annotated as ORPHANs;

Then, the tile that is associated with ORPHAN conflict type and is also the LRU among all the ORPHAN tiles in cache 122 is evicted to make room for the incoming cache.

In one implementation, the pre-determined count for NEXT is the smallest among the three conflict types mentioned above; whereas, the pre-determined count for FAR is the largest.

In addition, one embodiment of CPM 118 supports a "fallback" mode, in which CPM 118 manages cache 122 as a LRU reactive cache. Specifically, under certain conditions, CPM 118 enters this fall-back mode and does not consider the look-ahead intelligence provided by CCB 108 in its caching decisions. Instead, the LRU cache entries of cache 122 are evicted on a regular basis to make room for new tiles corresponding to incoming transaction requests. One condition that may cause CPM 118 to enter this fall-back mode is when CPM 118 recognizes that the incoming look-ahead information is untrustworthy. For example, CPM 118 may establish this untrustworthiness after exceeding a threshold frequency of annotating a tile as ORPHAN. Other conditions for triggering this fall-back mode may include 2D processing or other processing modes, in which ultimate performance is not required and it is either inconvenient or infeasible to generate look-ahead information required for prescient caching as discussed above. The specific conditions discussed above are for illustration purposes only, and a person skilled in the art should recognize that other conditions can beneficially trigger the fall-back mode.

Figure 6:
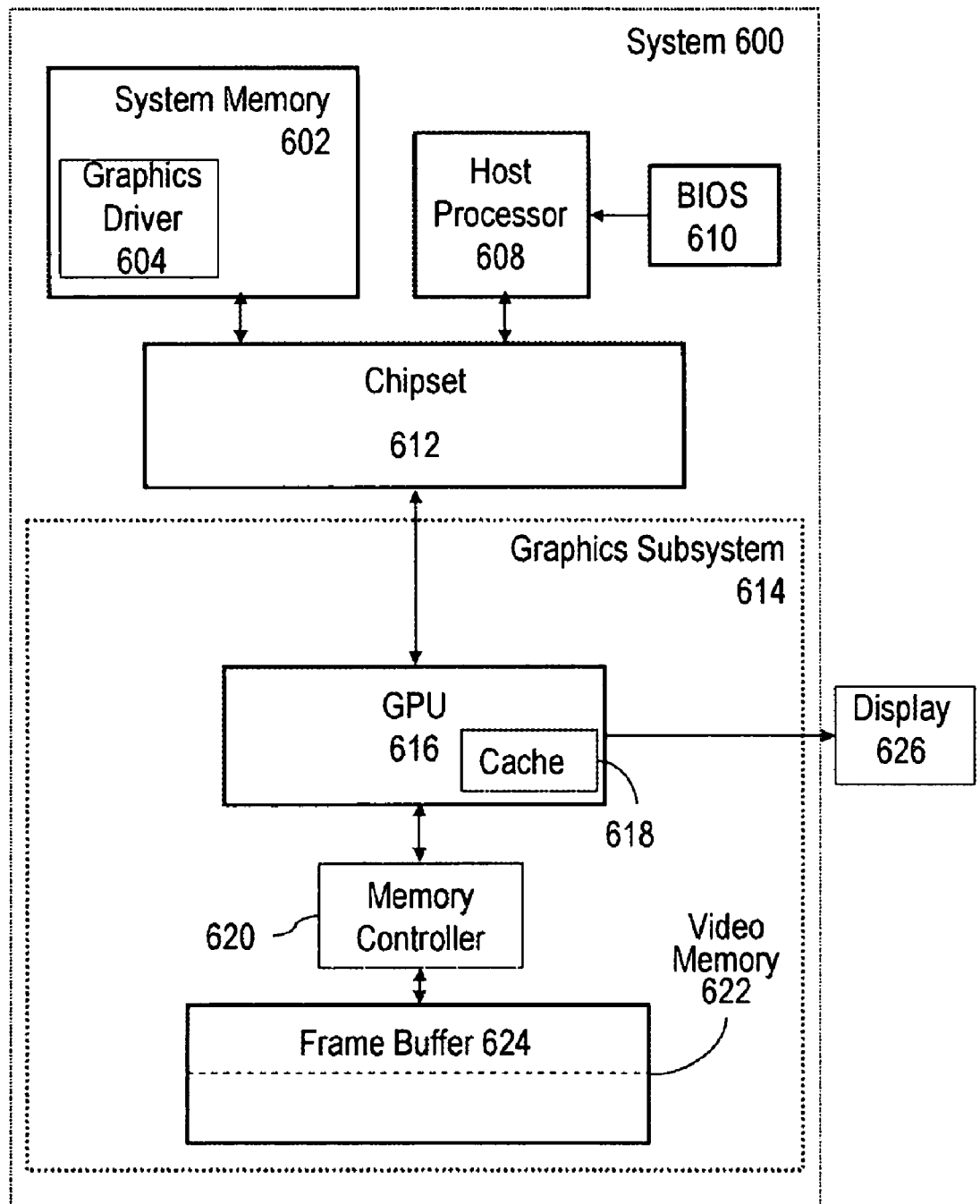
FIG. 6 is a block diagram of a system configured to implement one or more aspects of the present invention.

FIG. 6 is a block diagram of a system configured to implement one or more aspects of the present invention. Without limitation, system 600 may be a desktop computer, server, laptop computer, palm-sized computer, tablet computer, game console, cellular telephone, hand-held device, mobile device, computer based simulator, or the like. System 600 includes host processor 608, BIOS 610, system memory 602, and chipset 612 that is directly coupled to graphics subsystem 614. BIOS 610 is a program stored in read only memory ("ROM") or flash memory that is run at bootup. Graphics subsystem 614 includes a single GPU, GPU 616.

A device driver, graphics driver 604, stored within system memory 602, configures GPU 616 to share the graphics processing workload performed by system 600 and communicate with applications that are executed by host processor 608. In one embodiment, graphics driver 604 generates and places a stream of commands in a "push buffer." When the commands are executed, certain tasks, which are defined by the commands, are carried out by the GPU.

In some embodiments of system 600, chipset 612 provides interfaces to host processor 608, memory devices, storage devices, graphics devices, input/output ("I/O") devices, media playback devices, network devices, and the like. It should be apparent to a person skilled in the art to implement chipset 612 in two or more discrete devices, each of which supporting a distinct set of interfaces.

GPU 616 is responsible for outputting image data to display 626. Display 626 may include one or more display devices, such as, without limitation, a cathode ray tube ("CRT"), liquid crystal display ("LCD"), or the like. GPU 616 has on-chip cache 618 and is also coupled to memory controller 620 and video memory 622, each of which in one embodiment corresponds to cache 122, memory controller 120, and video memory 124 as shown in FIG. 1, respectively. Video memory 622 may be used to store image data and program instructions. In one embodiment, a portion of video memory 622 is allocated to store image data for display, frame buffer 624.

Upon execution of the commands in the aforementioned push buffer, one embodiment of GPU 616 performs the functions of the various engines as shown in FIG. 1 and performs the operations discussed above. It should be apparent to one of ordinary skill in the art to include two or more GPUs in graphics subsystems 614 or include two or more graphics subsystems 614 in a system. Moreover, although graphics subsystem 614 of systems 600 is shown to provide certain graphics processing capabilities, alternative embodiments of graphics subsystems 614 may process additional types of data, such as audio data, multimedia data, or the like.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A graphics system, comprising:
   a buffer having a logic unit and operating within a pre-raster engine operations stage in a graphics rendering pipeline,
   wherein the buffer is configured to store a plurality of tile entries, each tile entry having a screen coordinates field and a conflict field and being related to a transaction request that enters the pre-raster engine operations stage, and
   wherein if the buffer includes a first tile entry related to a first transaction request associated with a first tile and a second tile entry related to a second transaction request that enters the pre-raster engine operations stage after the first transaction request and is also associated with the first tile, the logic unit is configured to modify the conflict field of the first tile entry with a conflict type that reflects a number of tile entries between the first tile entry and the second tile entry.

2. The graphics system of claim 1, wherein the logic unit is further configured to set the screen coordinates field of each of the first tile entry and the second tile entry to reflect the screen coordinates of the first tile.

3. The graphics system of claim 1, wherein if the buffer includes a third tile entry related to a third transaction request that enters the pre-raster engine operations stage after the second transaction request and is also associated with the first tile, the logic unit is further configured to modify the conflict field of the second tile entry with a conflict type that reflects the number of tile entries in the buffer between the second tile entry and the third tile entry prior to evicting any tile entry from the buffer.

4. The graphics system of claim 1, wherein each of the plurality of tile entries has a cumulative coverage mask field, and the logic unit is further configured to:
   combine a first coverage mask associated with the first tile entry with a second coverage mask associated with the second tile entry to establish a cumulative coverage mask; and
   update the cumulative coverage mask field of the first tile entry with the cumulative coverage mask.

5. The graphics system of claim 4, wherein the logic unit is further configured to update the cumulative coverage mask field of the first tile entry by combining the cumulative coverage mask with a third coverage mask associated with the third tile entry.

6. The graphics system of claim 5, wherein each of the first, second, and third coverage masks corresponds to a pixel cluster in the first tile.

7. The graphics system of claim 6, further comprising a memory controller, wherein based on the cumulative coverage mask, the memory controller issues a single request to access the memory locations for the pixel clusters in the first tile.

8. The graphics system of claim 1, further comprising a local cache operating within a raster engine operations stage in the graphics rendering pipeline, wherein the local cache is configured to follow a plurality of caching decisions according to at least the conflict types in the conflict fields of the plurality of tile entries.

9. A method, comprising:
   storing a plurality of tile entries in a buffer within a pre-raster engine operations stage in a graphics rendering pipeline, each tile entry having a screen coordinates field and a conflict field and being related to a transaction request that enters the pre-raster engine operations stage, and
   if the buffer includes a first tile entry related to a first transaction request associated with a first tile and a second tile entry related to a second transaction request that enters the pre-raster engine operations stage after the first transaction request and is also associated with the first tile, modifying the conflict field of the first tile entry with a conflict type that reflects a number of tile entries between the first tile entry and the second tile entry.

10. The method of claim 9, further comprising setting the screen coordinates field of each of the first tile entry and the second tile entry to reflect the screen coordinates of the first tile.

11. The method of claim 9, further comprising if the buffer includes a third tile entry related to a third transaction request that enters the pre-raster engine operations stage after the second transaction request and is also associated with the first tile, modifying the conflict field of the second tile entry with a conflict type that reflects the number of tile entries in the buffer between the second tile entry and the third tile entry prior to evicting any tile entry from the buffer.

12. The method of claim 9, wherein each of the plurality of tile entries has a cumulative coverage mask field, further comprising:
   combining a first coverage mask associated with the first tile entry with a second coverage mask associated with the second tile entry to establish a cumulative coverage mask; and
   updating the cumulative coverage mask field of the first tile entry with the cumulative coverage mask.

13. The method of claim 12, further comprising updating the cumulative coverage mask field of the first tile entry by combining the cumulative coverage mask with a third coverage mask associated with the third tile entry.

14. The method of claim 13, wherein each of the first, second, and third coverage masks corresponds to a pixel cluster in the first tile.

15. The method of claim 14, further comprising accessing memory resources for the pixel clusters in the first tile with a single request based on the cumulative coverage mask.

16. The method of claim 9, further comprising following a plurality of caching decisions for a local cache operating within a raster engine operations stage in the graphics rendering pipeline according to at least the conflict types in the conflict fields of the plurality of tile entries.

17. A computing device, which is configured to:
   store a plurality of tile entries in a buffer within a pre-raster engine operations stage in a graphics rendering pipeline, each tile entry having a screen coordinates field and a conflict field and being related to a transaction request that enters the pre-raster engine operations stage, and
   if the buffer includes a first tile entry related to a first transaction request associated with a first tile and a second tile entry related to a second transaction request that enters the pre-raster engine operations stage after the first transaction request and is also associated with the first tile, a logic unit is configured to modify the conflict field of the first tile entry with a conflict type that reflects a number of tile entries between the first tile entry and the second tile entry.

18. The computing device of claim 17, if the buffer includes a third tile entry related to a third transaction request that enters the pre-raster engine operations stage after the second transaction request and is also associated with the first tile, further modifies the conflict field of the second tile entry with a conflict type that reflects the number of tile entries in the buffer between the second tile entry and the third tile entry prior to evicting any tile entry from the buffer.

19. The computing device of claim 17, wherein each of the plurality of tile entries has a cumulative coverage mask field, further
   combines a first coverage mask associated with the first tile entry with a second coverage mask associated with the second tile entry to establish a cumulative coverage mask; and
   updates the cumulative coverage mask field of the first tile entry with the cumulative coverage mask.

20. The computing device of claim 19, further updates the cumulative coverage mask field of the first tile entry by combining the cumulative coverage mask with a third coverage mask associated with the third tile entry.

* * * * *